J. Leitch,
Globe Valve,
Nº 40,939.    Patented Dec. 15, 1863.
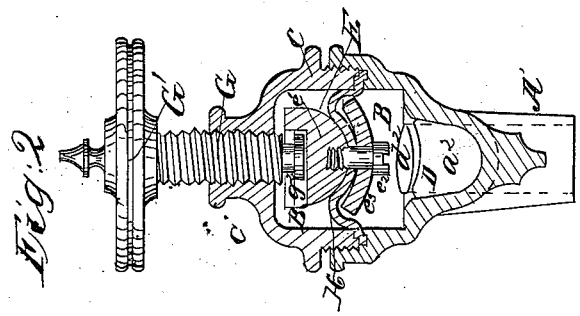
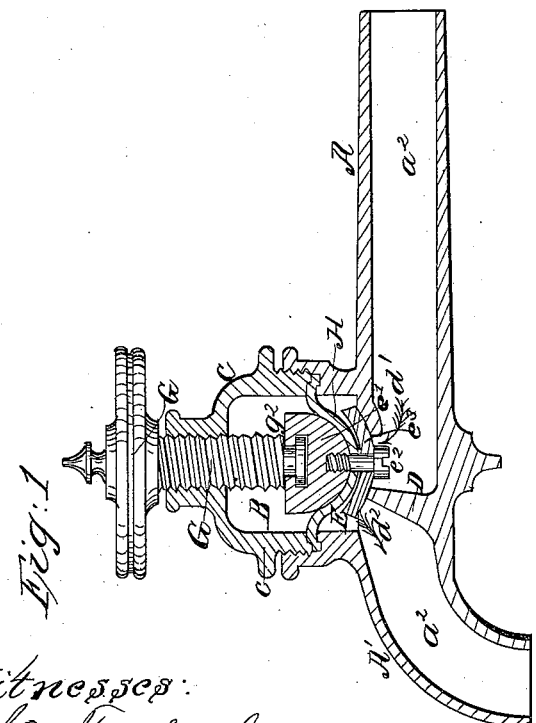
Witnesses:
H. H. Forbush
Geo. W. Wallace
Inventor:
John Leitch

UNITED STATES PATENT OFFICE.

JOHN LEITCH, OF BUFFALO, NEW YORK.

IMPROVEMENT IN FAUCETS.

Specification forming part of Letters Patent No. 40,939, dated December 15, 1863.

*To all whom it may concern:*

Be it known that I, JOHN LEITCH, of the city of Buffalo, county of Erie, and State of New York, have invented a new and Improved Faucet; and I do hereby declare that the following is a full, clear, and exact description thereof, reference being had to the accompanying drawings and the letters of reference marked thereon, in which—

Figure I is a longitudinal section, and Fig. II a cross section.

Like letters refer to like parts in each of the figures.

A represents the butt of the faucet, A′ the nozzle, and $a^2$ the passage through.

B is a valve-chamber above the passage $a^2$, and is formed partly in the body of the faucet and partly in the screw-cap C.

D is an abutment closing the passage $a^2$ and causing the fluid to enter the valve-chamber (when the valve is raised) through the opening $d'$, from which it issues into the nozzle through the opening $d^2$ on the other side of the abutment. A slightly conical or spherical valve-seat is formed around the opening $d'$, so that when the valve is down the opening is closed.

E represents the valve. It consists of a hemispherical piece of metal, $e'$, to which is secured, by the screw $e^2$, a circular leather washer, $e^3$. The valve is raised and lowered by means of the screw G (having a thumb-wheel, G′, upon its end) working through the cap C, the connection of the screw to the valve being by a swivel-joint, as shown at $g^2$, which allows the screw to turn without turning the valve.

H represents a diaphragm formed of a circular piece of leather or rubber pressed into a cup-like form, as represented. It is firmly held by its periphery between the screw-cap C and shoulder $h'$, and is connected at its center to the valve between the washer $e^3$ and metal piece $e'$.

Fig. I represents the valve screwed down upon its seat, and the position of the diaphragm at such time; and Fig. II represents the valve open, and shows the accompanying change in the position of the diaphragm. It will be seen that the object of the diaphragm is to prevent the access of the fluid into the valve-chamber above the connection of the screw to the valve, so that there can be no possible leakage around the screw at any time. The diaphragm and valve are both moved by the direct action of the screw, without the use of springs or other devices liable to get out of repair or to be hindered in their operation by the action of the fluid upon them. This will make the faucet more durable and less liable to get out of order, while at the same time it materially lessens the cost of construction.

I claim—

The combination and arrangement of the abutment D, valve E, diaphragm H, and operating-screw G, substantially as described.

JOHN LEITCH.

Witnesses:
W. H. FORBUSH,
GEO. W. WALLACE.